(No Model.)
J. M. CEIS.
Weather-Strip.
No. 228,604. Patented June 8, 1880.
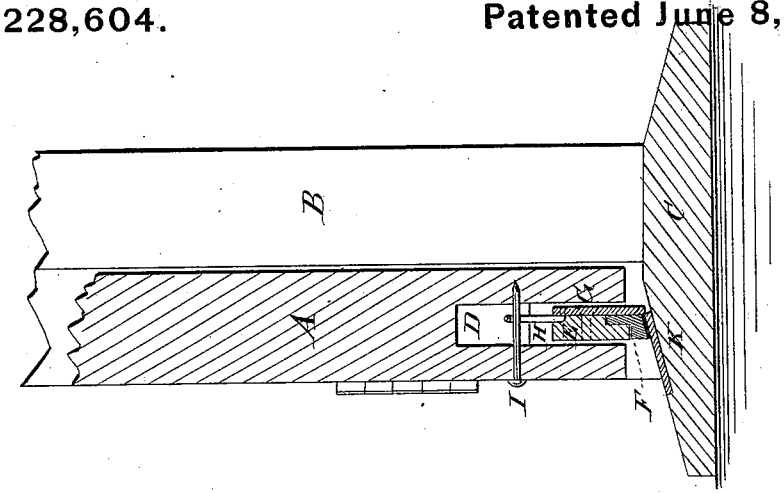
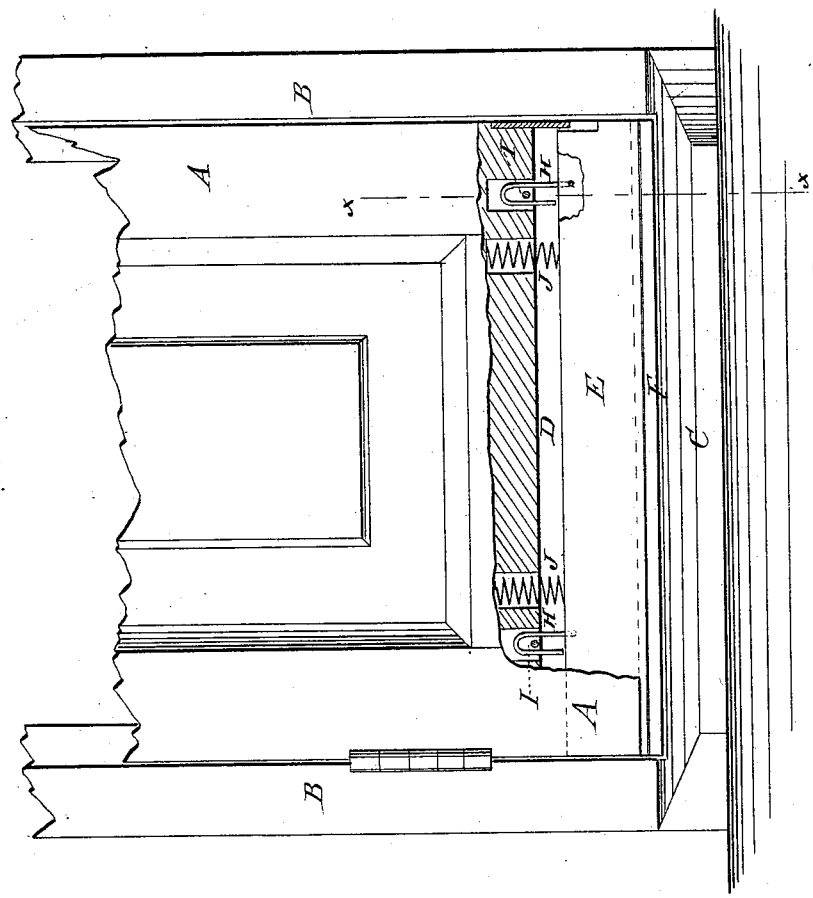
WITNESSES:
Chas. Nida
C. Sedgwick
INVENTOR:
J. M. Ceis
BY Munn & Co
ATTORNEYS.

UNITED STATES PATENT OFFICE.

JOHN M. CEIS, OF ABILENE, KANSAS.

WEATHER-STRIP.

SPECIFICATION forming part of Letters Patent No. 228,604, dated June 8, 1880.

Application filed March 30, 1880. (No model.)

*To all whom it may concern:*

Be it known that I, JOHN M. CEIS, of Abilene, Dickinson county, State of Kansas, have invented a new and useful Improvement in Weather-Strips for Doors, of which the following is a specification.

Figure 1 is a front elevation of the improvement, partly in section; and Fig. 2 is a sectional elevation taken through line $x$ $x$, Fig. 1.

Similar letters of reference indicate corresponding parts.

The object of this invention is to furnish weather-strips for doors to prevent wind, snow, rain, and dust from entering the house beneath the lower edge of the door, and which shall be simple in construction and effective and durable in use.

A represents a door. B are the door-posts, and C is the threshold. In the lower edge of the door A is formed a groove, D, to receive the weather-strip, which is formed of a wooden bar, E, a rubber plate, F, and a metal plate, G. The rubber plate F is securely clamped between the wooden bar E and the metal plate G. To the metal plate G, near its upper edge, are attached the ends of wires H, which are bent upward at right angles, and then bent over into U shape to form loops or slots. The loops H are inserted in holes bored in the door at the bottom of the groove D, and pins or screws I are passed through the door so as to pass through the loops H, and thus prevent the door-strips from dropping down too low. The door-strip E F G is held down by spiral or other springs, J, interposed between the upper edge of the door-strip E F G and the door at the bottom of the groove D.

An inclined metal plate, K, is attached to the threshold C for the door-strip E F G to work against to protect the threshold C from wear. With this construction, when the door is being closed the lower edge of the metal plate G comes in contact with the plate K or the upper side of the threshold C, and keeps the rubber plate F out of contact with the said plate or threshold until the door is fully closed.

When the door is fully closed the lower edge of the metal plate G passes off the metal plate K and allows the edge of the rubber plate F to come in contact with and rest upon the said plate K, forming a water-tight joint. As soon as the door begins to open the lower edge of the metal plate G again comes in contact with the plate K and prevents the rubber plate F from rubbing upon the said plate K and being worn. This construction makes the door-strip very durable.

Having thus described my invention, I claim as new and desire to secure by Letters Patent—

In a weather-strip for doors, the combination, with the strip E F G, of the metal plate K, attached to the threshold, substantially as herein shown and described, for the lower edge of the metal plate $g$ to rub against, and the lower edge of the rubber plate F to rest upon when the metal plate G has passed the upper edge of the plate K and the door is fully closed, as set forth.

JOHN MARTIN CEIS.

Witnesses:
ALFRED G. PETERS,
WILLIAM ORCUTT.